United States Patent
Yoo et al.

(10) Patent No.: US 9,654,845 B2
(45) Date of Patent: May 16, 2017

(54) ELECTRONIC APPARATUS OF GENERATING SUMMARY CONTENT AND METHOD THEREOF

(71) Applicant: SAMSUNG ELECTRONICS CO., LTD., Suwon-si, Gyeonggi-do (KR)

(72) Inventors: Jong-uk Yoo, Suwon-si (KR); Ki-hoon Shin, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 25 days.

(21) Appl. No.: 14/886,196

(22) Filed: Oct. 19, 2015

(65) Prior Publication Data
US 2016/0142794 A1    May 19, 2016

(30) Foreign Application Priority Data

Nov. 14, 2014  (KR) .................. 10-2014-0159019

(51) Int. Cl.
*H04N 9/80* (2006.01)
*H04N 21/8549* (2011.01)
(Continued)

(52) U.S. Cl.
CPC ... *H04N 21/8549* (2013.01); *G06F 17/30843* (2013.01); *G11B 27/036* (2013.01);
(Continued)

(58) Field of Classification Search
CPC ............ G06F 17/30843; G11B 27/036; H04N 21/4307; H04N 21/435; H04N 21/4394; H04N 21/47205; H04N 21/8549
(Continued)

(56) References Cited

U.S. PATENT DOCUMENTS

| 7,599,554 B2 | 10/2009 | Agnihotri et al. |
| 8,051,446 B1 | 11/2011 | Qian et al. |

(Continued)

FOREIGN PATENT DOCUMENTS

| JP | 2002-149672 | 5/2002 |
| JP | 2004-328478 | 11/2004 |

(Continued)

OTHER PUBLICATIONS

International Search Report and Written Opinion of the International Search Authority dated Mar. 31, 2016 in corresponding international Patent Application No. PCT/KR2015/010944.

(Continued)

*Primary Examiner* — Robert Chevalier
(74) *Attorney, Agent, or Firm* — Staas & Halsey LLP

(57) ABSTRACT

Disclosed herein is an electronic apparatus and method thereof. The electronic apparatus includes a communication unit receiving content and additional information for the content, a signal processing unit signal-processing the content and determining the signal-processed contents into one of an audio signal and a video frame, and a processor determining a first keyword and a second keyword for the first keyword by using the additional information and generating summary content according to a plurality of video frames synchronized to a plurality of audio signal sections corresponding to at least one of the first keyword and the second keyword. As a result, the summary contents are able to be easily generated.

20 Claims, 18 Drawing Sheets

(51) Int. Cl.
    *G06F 17/30*     (2006.01)
    *G11B 27/036*     (2006.01)
    *H04N 21/43*     (2011.01)
    *H04N 21/435*     (2011.01)
    *H04N 21/439*     (2011.01)
    *H04N 21/472*     (2011.01)

(52) U.S. Cl.
    CPC ....... *H04N 21/435* (2013.01); *H04N 21/4307* (2013.01); *H04N 21/4394* (2013.01); *H04N 21/47205* (2013.01)

(58) Field of Classification Search
    USPC ........ 386/241, 239, 243, 248, 262, 278, 281
    See application file for complete search history.

(56) References Cited

U.S. PATENT DOCUMENTS

| | | | |
|---|---|---|---|
| 9,146,993 B1* | 9/2015 | Chen | G06F 17/30864 |
| 2007/0168864 A1 | 7/2007 | Yamamoto et al. | |
| 2010/0005485 A1 | 1/2010 | Tian et al. | |
| 2011/0029873 A1* | 2/2011 | Eseanu | G11B 27/105 |
| | | | 715/719 |

FOREIGN PATENT DOCUMENTS

| | | |
|---|---|---|
| JP | 2008-148121 | 6/2008 |
| WO | 96/12240 | 4/1996 |

OTHER PUBLICATIONS

Extended European Search Report dated Jan. 28, 2016 in corresponding European Patent Application No. 15192777.9.

* cited by examiner

FIG. 12
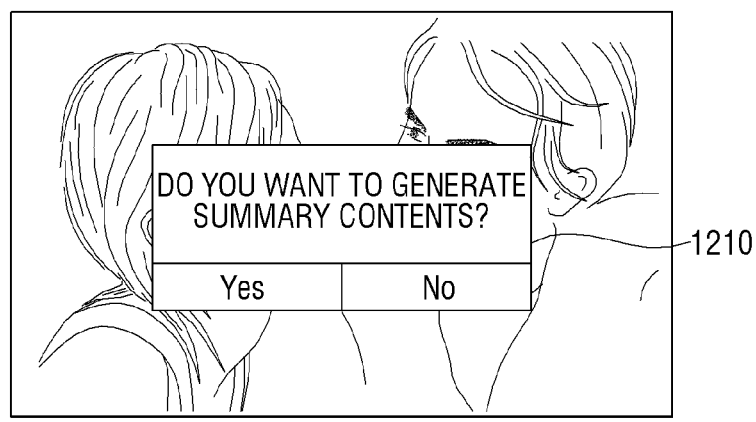
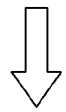
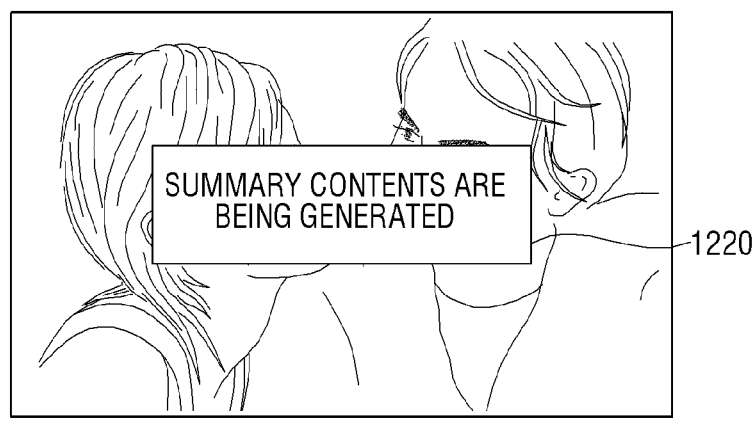
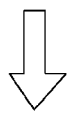
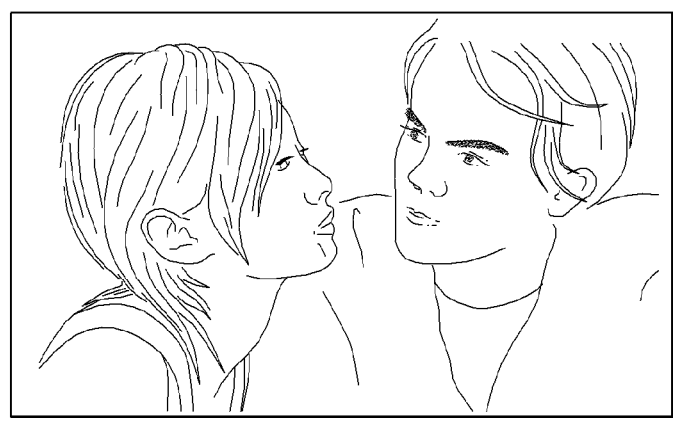

ELECTRONIC APPARATUS OF GENERATING SUMMARY CONTENT AND METHOD THEREOF

CROSS-REFERENCE TO RELATED APPLICATIONS

This application claims priority benefit from Korean Patent Application No. 10-2014-0159019, filed on Nov. 14, 2014, in the Korean Intellectual Property Office, the disclosure of which is incorporated herein by reference in its entirety.

BACKGROUND

1. Field

Apparatuses and methods consistent with the present disclosure relate to an electronic apparatus for generating summary content and method thereof, and more particularly, to an electronic apparatus for automatically generating summary content and method thereof.

2. Description of the Related Art

With the development of electronic technology, electronic apparatuses having various functions are used. The electronic apparatuses can receive and reproduce various types of contents.

With regard to the contents, summary of the contents for gaining a viewer's interest may be provided by abbreviating the contents. A method for preparing the summary of the contents may vary depending on the type of the contents. For example, in the case of the news, the summary can be prepared according to a topic or a keyword and in the case of entertainment, the summary can be configured mainly for a scene that causes laughter. In the case of dramas and movies, content based summary can be prepared so as to grasp all contents within a short time.

In particular, in the case of the dramas and the movies, the contents are developed according to characters and episodes and when the summary of the contents are prepared, primary characters and primary episodes need to be particularly included. Although other subsidiary scenes are excluded from the summary of the contents, the exclusion of other subsidiary scenes does not substantially exert a large influence on a whole flow. When the summary of the contents are obtained based on the characters and the episodes, the viewer can infer and appreciate the entirety of the contents by the summary of the contents.

However, in order to prepare the summary of the contents, there is a problem in that a long time is required due to using a method in which a person selects and edits the primary scene by directly viewing the contents from beginning to end in the related art.

Accordingly, the need for technology that can more conveniently and efficiently generate the summary of the contents comes to the fore.

SUMMARY

Exemplary embodiments of the present invention overcome the above disadvantages and other disadvantages not described above. Also, present invention is not required to overcome the disadvantages described above, and an exemplary embodiment of the present invention may not overcome any of the problems described above.

According to an embodiment, an electronic apparatus and method thereof automatically generates summary content by using additional information related to the content.

According to an aspect of the present invention, an electronic apparatus includes a communication unit to receive content and additional information for the content, a signal processing unit to perform signal-processing of the content and determine the signal-processed content as one of audio signal and a video frame, and a processor determining a first keyword and a second keyword for the first keyword by using the additional information and generating a plurality of video frames synchronized to a plurality of audio signal sections corresponding to at least one of the first keyword and the second keyword to generate summary contents.

Further, the additional information may include plot information summarizing the content, and the processor may detect at least one word included in the plot information as the first keyword, and retrieve the first keyword from a server and determine a keyword retrieved continuously with the first keyword as the second keyword.

The processor may divide the content into a plurality of content sections, divide the plot information into a plurality of plot sections to correspond to the divided plurality of content sections, respectively, and determine the first keyword and the second keyword for the plurality of plot sections, and determine a corresponding audio signal section for the plurality of content sections corresponding to the plurality of plot sections.

The processor may encapsulate, when the audio signal section corresponding to at least one of the first keyword and the second keyword is detected with a predetermined number or more within a specific section of the contents, the entirety of the specific section in the summary contents.

The processor may encapsulate, when a temporal difference between a first video frame which is one of the plurality of video frames and a second video frame which is the other one is less than a predetermined threshold time, all video frames between the first video frame and the second video frame in the summary contents.

The processor may exclude a word which is used at a predetermined frequency or less among the respective words included in the plot information from the first keyword.

The additional information may include an image of a character of the contents.

The processor may add a video frame in which the image is displayed among the plurality of video frames to the summary contents.

The processor may generate, with respect to a character which appears at a predetermined frequency or less by verifying the frequency of the video frame in which the image is displayed for each character in the entirety of the contents, the summary contents while excluding the video frame in which the image of the character is displayed.

The processor may detect the first keyword from the metadata and determine the second keyword relevant to the first keyword.

The electronic apparatus may further include a display unit, wherein the processor controls the summary contents to be displayed on at least one of a user interface (UI) screen providing a content list and a UI screen providing content summary information.

According to another aspect of the present invention, a method for generating summary contents by an electronic apparatus includes: receiving contents and additional information on the contents; signal-processing the contents and separating the signal-processed contents into an audio signal and a video frame; determining a first keyword and a second keyword for the first keyword by using the additional information; and generating the summary contents by collecting a plurality of video frames synchronized to a plurality of audio signal sections corresponding to at least one of the first keyword and the second keyword.

The additional information may include plot information acquired by summarizing the contents of the contents, and in the determining of the second keyword, each of words included in the plot information is detected as the first keyword, and the first keyword is retrieved in a predetermined server and a keyword retrieved continuously with the first keyword is determined as the second keyword.

In the generating of the summary contents, the contents may be divided into a plurality of content sections, the plot information may be divided into a plurality of plot sections in ranges corresponding to the plurality of content sections, respectively, the first keyword and the second keyword may be determined for each of the plurality of plot sections, and an audio signal section corresponding to the determined keyword may be discovered for each of contents corresponding to each plot section.

In the generating of the summary contents, when the audio signal section corresponding to at least one of the first keyword and the second keyword is detected with a predetermined number or more within a specific section of the contents, the entirety of the specific section may be included in the summary contents.

In the generating of the summary contents, when a temporal difference between a first video frame which is one of the plurality of video frames and a second video frame which is the other one is less than a predetermined threshold time, all video frames between the first video frame and the second video frame may be included in the summary contents.

In the generating of the summary contents, a word which is used at a predetermined frequency or less among the respective words included in the plot information may be excluded from the first keyword.

The additional information may include an image of a character of the contents, and in the generating of the summary contents, a video frame in which the image is displayed among the plurality of video frames may be added to the summary contents.

In the generating of the summary contents, with respect to a character which appears at a predetermined frequency or less by verifying the frequency of the video frame in which the image is displayed for each character in the entirety of the contents, the summary contents may be generated while excluding the video frame in which the image of the character is displayed.

In the determining of the second keyword, the first keyword may be detected from the metadata and the second keyword relevant to the first keyword may be determined.

The method may further include displaying the summary contents on at least one of a UI screen providing a content list and a UI screen providing content summary information.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present invention will be more apparent by describing certain exemplary embodiments of the present invention with reference to the accompanying drawings, in which:

FIG. 12 is a diagram for describing a method for generating the summary contents according to an exemplary embodiment;

DETAILED DESCRIPTION

Figure 1:
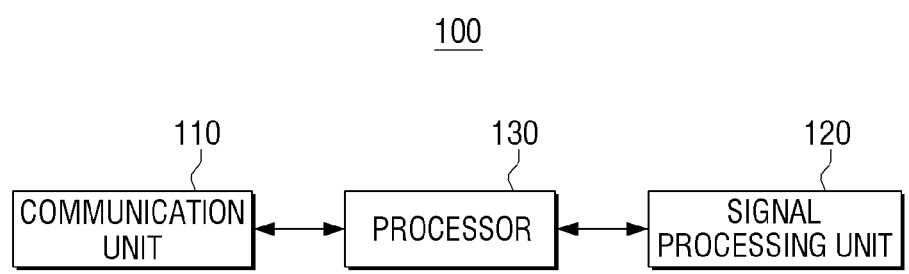
FIG. 1 is a block diagram illustrating a configuration of an electronic apparatus according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Hereinafter, the present invention will be described in detail with reference to the accompanying drawings.

FIG. 1 is a block diagram illustrating a configuration of an electronic apparatus 100 according to an exemplary embodiment. As illustrated in FIG. 1, the electronic apparatus 100 includes a communication unit 110, a signal processing unit 120, and a processor 130.

The communication unit 110 performs communication with an external server. While example of an external server is used herein, the communication unit 110 is not limited to communicating with the external server. For example, the communication unit 110 may communicate with a computer system or any other electronic device that may serve as a source of information from which the information may be retrieved. Further, while the source of the information may be a database of the communication unit 110. The communication unit 110 may receive or obtain content(s) and additional information for the content(s) from the external server and when summary contents are generated, the communication unit 110 may transmit the generated summary contents to the external server. The contents and the additional information of the contents may be simultaneously received, but are not limited thereto. For example, the contents may be received and stored in advance and thereafter, when a user inputs a summary content generation command, the summary contents may be generated by receiving the additional information of the contents. Further, the contents may be received from a content server operated by a broadcast provider and the additional information for the contents may be received from a web.

The communication unit 110 may perform communications with the external server by using various communication modes including Ethernet, wireless LAN, Wi-Fi, and the like, but is not particularly limited thereto. Further, the communication unit 110 may perform communications with other electronic apparatuses in addition to the external server.

The signal processing unit 120 may be implemented as a signal processing circuit and the contents received through the communication unit 110 are signal-processed to be separated into an audio signal and a video frame.

In detail, the signal processing unit 120 may include a demultiplexing unit, an audio decoder unit, and a video decoder unit.

The demultiplexing unit demultiplexes contents to be regenerated as separate demultiplexed contents of audio data and video data.

The audio decoder unit and the video decoder unit may decode the audio data and the video data separated by the demultiplexing unit, respectively. Hereinafter, the decoded audio data is described as the audio signal and the decoded video data is described as the video frame for easy description and for helping appreciation of the present invention.

Meanwhile, the aforementioned content may further include metadata such as text information, and EPG (electronic program guide) information in addition to the audio signal and the video frame. In this case, the signal processing unit 120 may separate the audio signal and the video frame, and the metadata included in the contents by signal-processing the received contents.

The processor 130 controls an overall operation of the electronic apparatus 100.

The processor 130 determines the basic keyword (a first keyword) and the relevant keyword (a second keyword) for the basic keyword by using the additional information of the content received by the communication unit 110. For example, the relevant keyword may be a keyword associated with the basic keyword. For example, the relevant keyword may be a keyword associated with a meaning or a letter shape of the basic keyword. Further, the relevant keyword may be a keyword determined by analyzing the relationship between continuously retrieved keywords in a server such as a specific purpose server and detailed contents thereof will be described below. While the relationship between retrieved keywords is explained using continuous retrieval, the present invention is not limited thereto. For example, the relationship between the retrieved keywords may be any association therebetween including but not limited to a level of relevancy of the keywords, frequency of retrieval the keywords, etc.

In addition, the processor 130 may generate the summary of the content by collecting a plurality of video frames synchronized to a plurality of audio signal sections corresponding to at least one of the basic keyword and the relevant keyword among audio signal sections separated by the signal processing unit 120. The summary contents may be generated to include the plurality of video frames, but are not limited thereto. For example, the summary contents including the audio signal corresponding to the plurality of video frames may be generated. Further, the processor 130 may control the signal processing unit 120 in order to generate the summary contents. In detail, the processor 130 may control the signal processing unit 120 in order to collect the plurality of video frames.

Meanwhile, the processor 130 as a component that generally serves to control the apparatus may be mixedly used with a CPU, a microcomputer, and the like. Hereinafter, the components are described while being integrated into the processor 130.

Further, the processor 130 and the signal processing unit 120 may be implemented as one system on chip (SoC). However, hereinafter, the processor 130 and the signal processing unit 120 will be separately described for easy description.

Hereinafter, various methods for generating the summary contents of the processor 130 will be described.

Figure 2:
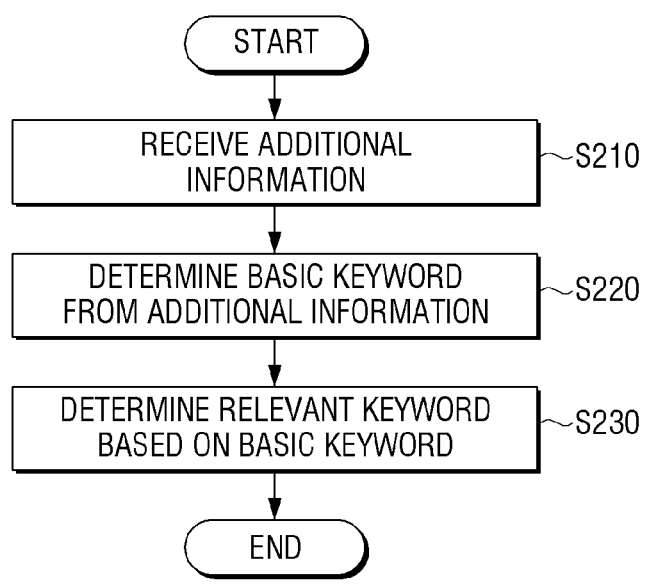
FIG. 2 is a flowchart for describing a method for determining a keyword according to an exemplary embodiment.

FIG. 2 is a flowchart for describing a method for determining a keyword according to an exemplary embodiment.

Referring to FIG. 2, the electronic apparatus 100 receives the additional information of the contents with receiving the contents (S210). The additional information of the content may be simultaneously received with the content or the additional information may be received at a different time than the content. The additional information of the contents may be plot information, highlight information, and character information of the contents. The additional information of the contents may be received directly from a specific purpose server provided externally or a website through connection to the Internet. Meanwhile, when the additional information of the contents is not received, the processor 130 may use as the additional information of the contents the metadata such as the text information and the EPG information included in the contents among the audio signal and the video frame, and the metadata may be signal-processed and separated by the signal processing unit 120.

When the processor 130 receives the additional information of the contents, the processor 130 determines the basic keyword from the received additional information (S220). The processor 130 may determine all nouns included in the additional information of the contents as the basic keyword. However, the processor 130 is not limited thereto and may determine as the basic keyword only a noun which is used at a predetermined frequency or more among the nouns included in the additional information of the contents. Contents related therewith will be described below.

In addition, the processor 130 determines the relevant keyword from the basic keyword (S230). The relevant keyword may be a keyword determined by analyzing the relationship between the keywords which are continuously retrieved in the specific server. For example, the basic keyword may be retrieved in the specific server and the continuously retrieved keyword may be determined as the relevant keyword. Further, the relationships among the continuously retrieved keywords may be accumulatively stored to determine the relevant keyword based on accumulated data.

In addition, the specific server may be a retrieval engine server provided separately from the electronic apparatus 100. For example, the basic keyword may be retrieved from a specific retrieval engine server as the relevant keyword and the electronic apparatus 100 may determine the continuously retrieved keyword. However, the electronic apparatus 100 is not limited thereto and when the electronic apparatus 100 transmits the basic keyword to the specific retrieval engine server, the electronic apparatus 100 may receive at least one of the keywords which are retrieved continuously with the basic keyword from the specific retrieval engine server. The electronic apparatus 100 may determine at least one of the received keywords as the relevant keyword. Further, the specific retrieval engine server may determine the relevant keyword based on the relationship among the continuously retrieved keywords and the electronic apparatus 100 may use the received keyword itself as the relevant keyword without determining the relevant keyword among the received keywords. In addition, the specific server may not be the retrieval engine server and a manufacturer that manufactures the electronic apparatus 100 may directly have the specific server. Moreover, the electronic apparatus 100 may store relevant keyword information relevant to the basic keyword.

Further, the processor 130 may determine as the relevant keyword a synonym of the basic keyword or receive the synonym from the specific server. For example, when the basic keyword is 'crime', the processor 130 may determine as the relevant keyword synonyms such as 'law-breaking', 'illegal act', and the like. In addition, the processor 130 may determine as the relevant keyword a dialect or an old saying of the basic keyword or determine as the relevant keyword related keywords such as 'judge', 'court', and 'supreme court'.

Figure 3:
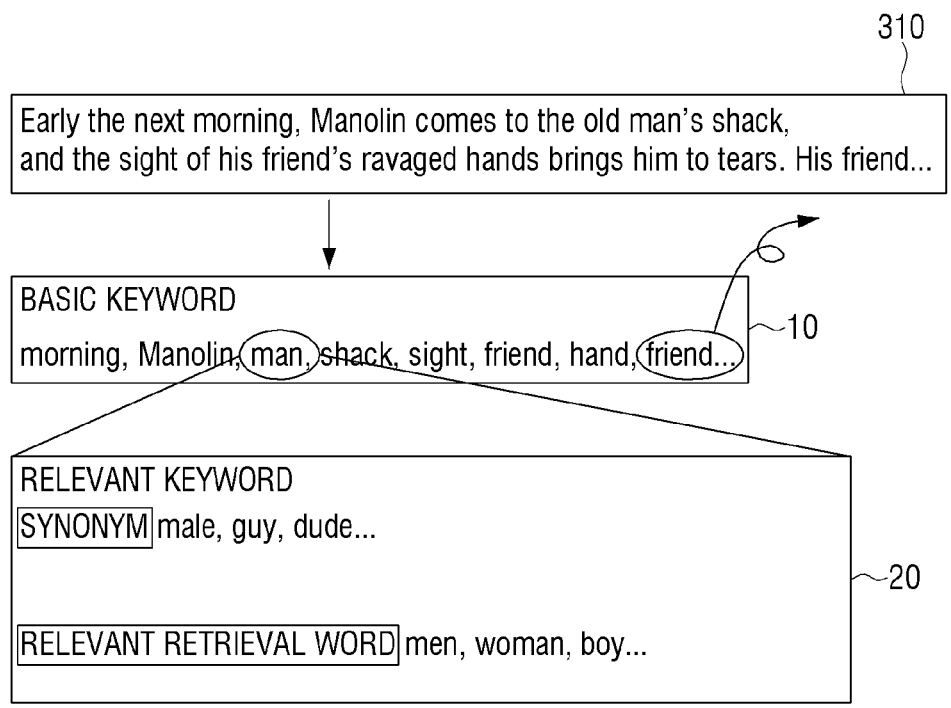
FIG. 3 is a diagram for describing determining a relevant keyword from plot information according to an exemplary embodiment.

FIG. 3 is a diagram for describing determining of a relevant keyword 20 from plot information 310 according to an exemplary embodiment.

Referring to FIG. 3, the processor 130 may remove a verb, a determiner, an adverb, and the like from the plot information 310 received through the communication unit 110 and extract only the noun. The plot information 310 may be information acquired by summarizing data of the content. Further, the plot information 310 may be text information. However, the plot information 310 is not limited thereto and the plot information 310 may be constituted by the text and a picture and in this case, the processor 130 extracts the text to determine the basic keyword 10.

The processor 130 may delete a duplicated noun among extracted nouns and determine residual nouns as the basic keyword 10. For example, the processor 130 may extract nouns such as 'morning', 'Manolin', 'man', 'shack', 'sight', 'friend', 'hand', 'friend', and the like from the plot information 310. Herein, the processor 130 may determine the basic keyword 10 constituted by 'morning', 'Manolin', 'man', 'shack', 'sight', 'friend', 'hand', and the like by removing the second 'friend' which is duplicated.

When the basic keyword 10 is determined, the processor 130 may determine the relevant keyword 20 from the basic keyword 10. In FIG. 3, the relevant keyword 20 for 'man' among the basic keyword 10 is illustrated. The processor 130 may determine 'male', 'guy', 'dude', and the like as synonyms for 'man' and 'men', 'woman', 'boy', and the like as relevant retrieval words. Herein, the relevant retrieval word may be a keyword determined by analyzing the relationship among the keywords which are continuously retrieved. However, the relevant keyword is not limited thereto and an antonym and/or keyword other than the synonym, the relevant retrieval word, and the like may be determined as the relevant keyword. Further, all relevant keywords 20 arranged in FIG. 3 may not be used and may be selectively used in any degree. A configuration in which only some of the basic keyword 10 and the relevant keywords 20 determined by the processor 130 are used will be described below.

The method for determining the basic keyword 10 and the relevant keyword 20 based on the plot information 310 is described in FIG. 3, but the method is not limited thereto. For example, the processor 130 may detect the basic keyword from the metadata and may determine the relevant keyword relevant to the basic keyword. Further, the processor 130 may use the verb as the basic keyword and determine the relevant keyword based on a plurality of basic keywords. In addition, the processor 130 may use only the basic keyword 10 without using the relevant keyword 20.

Further, it is described that the plot information 310 is received as the additional information in FIG. 3, but if the additional information is not the plot information 310 but image information or information including an image, the metadata may be extracted by the signal processing unit 120. The processor 130 may extract the basic keyword from the metadata.

Figure 4:
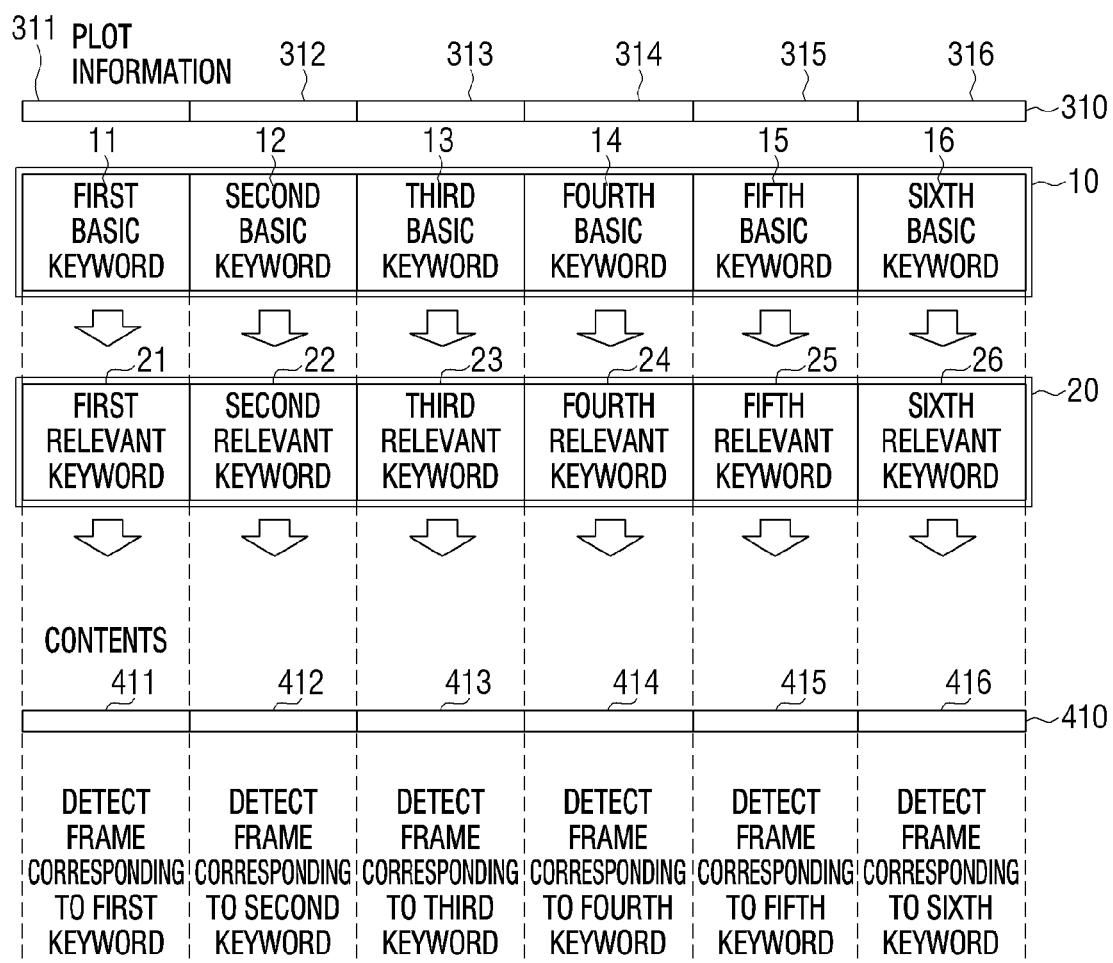
FIG. 4 is a diagram for describing a method for detecting a video frame for each section according to an exemplary embodiment.

FIG. 4 is a diagram for describing a method for detecting a video frame for each section according to an exemplary embodiment.

Referring to FIG. 4, the processor 130 may divide content 410 into a plurality of content sections 411, 412, 413, 414, 415, and 416 and divide the plot information 310 into a plurality of plot sections 311, 312, 313, 314, 315, and 316 in ranges corresponding to the plurality of content sections, respectively. In addition, the processor 130 may determine the basic keyword 10 and the relevant keyword 20 for each of the plurality of plot sections and may discover an audio signal section corresponding to a keyword determined for each content section corresponding to each plot section.

In detail, the processor 130 may divide the received contents 410 into six sections. In this case, the received contents 410 are divided into six sections in FIG. 4, but are not limited thereto and the contents 410 may be divided even into six sections or more based on a regeneration time of the contents, and the like. Further, the number of sections is received by the user to divide the contents 410 into sections having the received number of sections.

In addition, the processor 130 may divide the plot information 310 into the plurality of plot sections 311, 312, 313, 314, 315, and 316 in the ranges corresponding to the plurality of content sections 411, 412, 413, 414, 415, and 416, respectively. In this case, the processor 310 may divide the plot information into the plurality of plot sections in the ranges corresponding to the content sections, respectively based on a data capacity, the number of lines, the number of paragraphs, and the like. For example, when it is assumed that the number of all lines of the plot information 310 is 120 lines based on the number of lines, the processor 130 may divide the plot information 310 into the plurality of, for example, six plot sections each constituted by 20 lines. Further, when it is assumed that the number of all paragraphs of the plot information 310 is 18 based on the paragraph, the processor 130 may divide the plot information 310 into the plurality of, for example, six plot sections each constituted by 3 paragraphs.

The processor 130 may determine the basic keyword 10 for each section. As a result, a first basic keyword 11 is determined in a first section 311 of the plot information 310 and a second basic keyword 12 is determined in a second section 312, and the basic keyword 10 may be determined for each section similarly even in the residual sections. Since the method for determining the basic keyword 10 for each section has been described above, the description of the method is omitted.

The processor 130 may determine the relevant keyword 20 from the basic keyword 10 for each section by the aforementioned method. As a result, a first relevant keyword 21 may be determined from the first basic keyword 11 and a second relevant keyword 22 may be determined from the second basic keyword 12, and the relevant keyword 20 may also be determined for each section similarly even in the residual sections. Since the method for determining the relevant keyword 20 for each section has been described above, the method is omitted.

The processor 130 detects the video frame by using a first relevant keyword 21 with respect to a first section 411 of the contents 410. In detail, the processor 130 may generate a first summary content for the first section 411 of the contents 410 by collecting a plurality of video frames synchronized to the plurality of audio signal sections corresponding to at least one of the first basic keyword 11 and the first relevant keyword 21 in the first section 411 of the contents 410. The processor 130 generates and collects respective summary contents for all sections to generate one summary content.

In such an example, the contents 410 and the plot information 310 are compared for each section to reduce erroneous detection of a word, thereby efficiently generating the summary contents.

Figure 5:
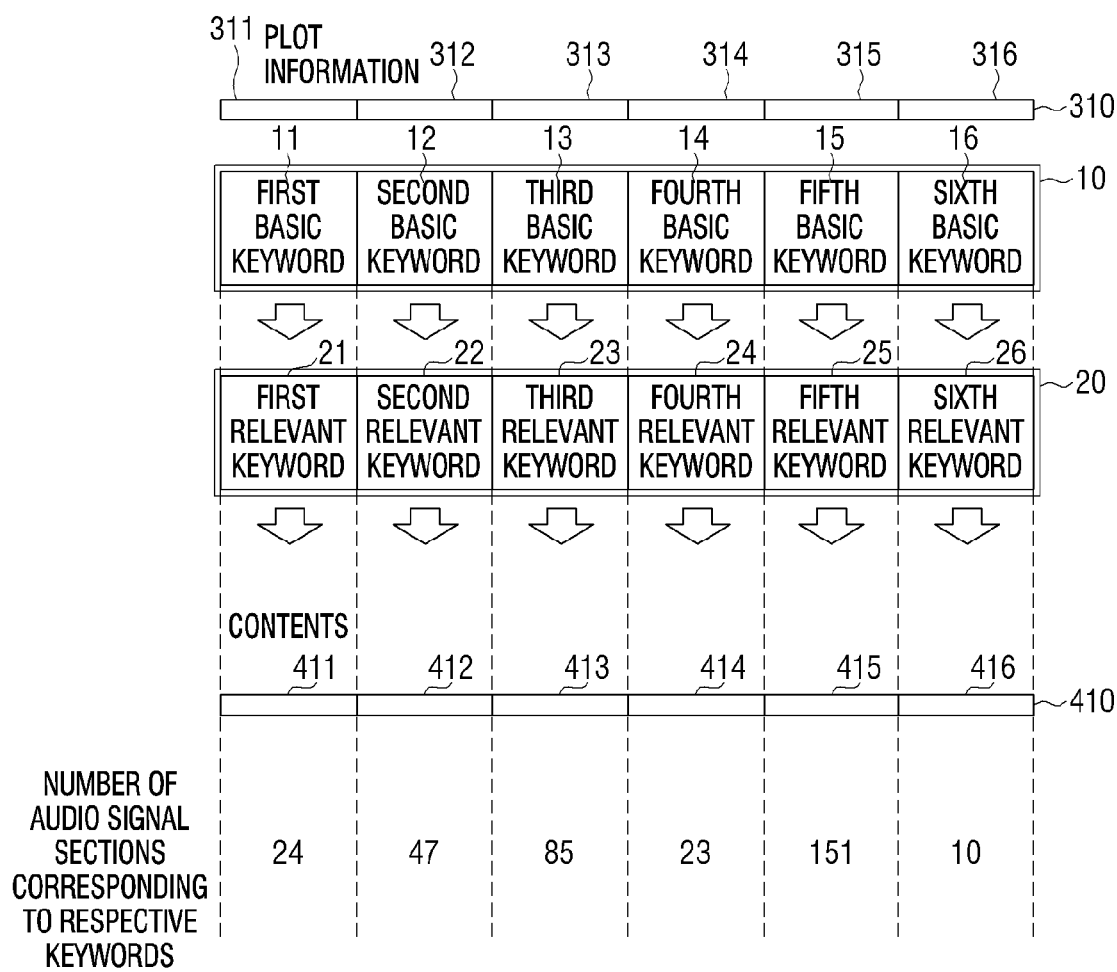
FIG. 5 is a diagram for describing a method for encapsulating the entirety of a specific section in summary contents according to an exemplary embodiment.

FIG. 5 is a diagram for describing a method for encapsulating the entirety of a specific section in summary contents according to an exemplary embodiment.

Referring to FIG. 5, when the audio signal sections corresponding to at least one of the basic keyword 10 and the relevant keyword 20 are detected with a predetermined number or more in a specific section of the contents, the processor 130 may encapsulate the entirety of the specific section in the summary contents. For example, when the contents 410 are divided into six sections as illustrated in FIG. 4, the processor 130 may detect the plurality of audio signal sections corresponding to at least one of the basic keyword 10 and the relevant keyword 20 with respect to the respective sections of the contents. Further, the processor 130 may calculate the number of audio signal sections detected in each section.

When it is assumed that the predetermined number is 150, in a fifth section 415 of the contents 410, the number of the detected audio signals is the predetermined number or more as 151. As a result, the processor 130 may encapsulate the entirety of the fifth section 415 of the contents 410 in the summary contents. However, in other sections of the contents 410, the number of the detected audio signals does not correspond to the predetermined number or more. Accordingly, the processor 130 may collect only a plurality of frames synchronized to the plurality of audio signal sections corresponding to at least one of the basic keyword 10 and the relevant keyword 20 with respect to the respective sections. Meanwhile, the predetermined number of the audio signal sections may be set by the user.

According to the exemplary embodiment, the entirety of a section where more selected audio signal sections corresponding to the keyword may be included in the summary contents, and as a result, a primary section may be easily detected and it is possible to generate summary contents which are advantageous in transferring the meaning.

Figure 6:
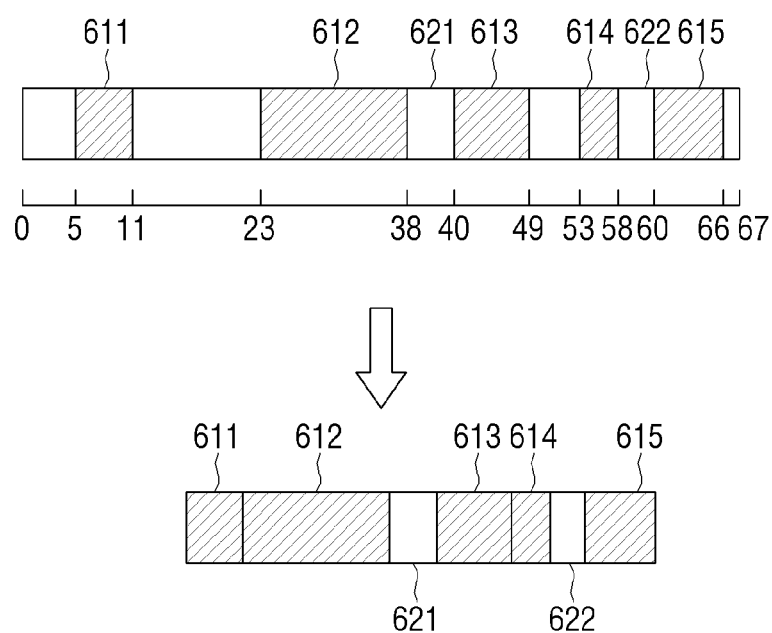
FIG. 6 is a diagram for describing a method for adding additional video frame to a plurality of video frames according to an exemplary embodiment.

FIG. 6 is a diagram for describing a method for adding additional video frame to a plurality of video frames according to an exemplary embodiment.

According to FIG. 6, when a temporal difference between a first video frame which is one of the plurality of video frames and a second video frame which is the other one is less than a predetermined threshold time, the processor 130 may encapsulate all video frames between the first video frame and the second video frame in the summary content.

The processor 130 may detect relative positions of the plurality of video frames synchronized to the plurality of audio signal sections corresponding to at least one of the basic keyword 10 and the relevant keyword 20 with respect to all contents. A first portion of FIG. 6 illustrates video frame sections 611, 612, 613, 614, and 615 extracted by the processor 130. Further, the entirety of the contents are 67 minutes, a first extracted video frame section 611 is 5 to 11 minutes, a second extracted video frame section 612 is 23 to 38 minutes, and a third extracted video frame section 613 is 40 to 49 minutes.

When the temporal difference between the first video frame and the second video frame is less than the predetermined threshold time based on temporal information of the extracted video frame, the processor 130 may additionally encapsulate a video frame which is not extracted between the first video frame and the second video frame, in the summary contents. For example, when it is assumed that the predetermined threshold time is 3 minutes in the first portion of FIG. 6, a time between the second and third extracted video frame sections 612 and 613 and a time between the fourth and fifth extracted video frame sections 614 and 615 are less than the predetermined threshold time as 2 minutes. Therefore, the processor 130 may encapsulate the video frames 621 and 622 corresponding to the time between the second and third extracted video frame sections 612 and 613 and the time between the fourth and fifth extracted video frame sections 614 and 615 in the summary contents. This is illustrated in a second portion of FIG. 6.

However, a time between the first and second extracted video frame sections 611 and 612 is 12 minutes and a time between the third and fourth extracted video frame sections 613 and 614 is 4 minutes, and the processor 130 may not encapsulate a section larger than a predetermined threshold time in the summary contents.

In such an example, the predetermined threshold time may be selected by the user. Further, when the summary contents are generated, a section less than the predetermined threshold time may be included in the summary contents, and as a result, the summary contents may be more smoothly generated.

Figure 7:
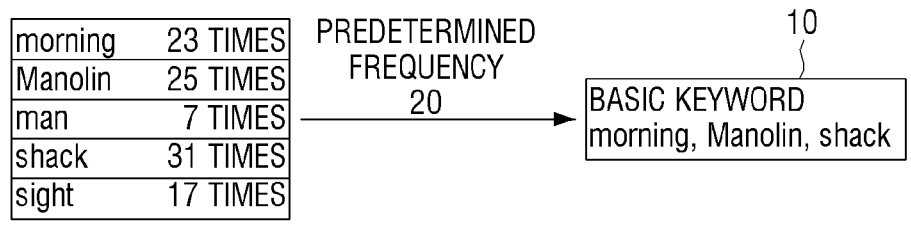
FIG. 7 is a diagram for describing a method for determining a basic keyword according to an exemplary embodiment.

FIG. 7 is a diagram for describing a method for determining a basic keyword 10 according to an exemplary embodiment.

According to FIG. 7, the processor 130 may exclude a word which is used at the predetermined frequency or less among respective words included in the plot information 310 from the basic keyword 10. It is assumed that a noun included in the plot information 310 is extracted in FIG. 7. The processor 130 may calculate frequencies at which the respective extracted nouns are used in the plot information 310. In FIG. 7, it is assumed that 'morning', 'Manolin', 'man', 'shack', and 'sight' are used at 23 times, 25 times, 7 times, 31 times, and 17 times, respectively.

The processor 130 may examine whether the use frequencies of the respective extracted nouns is a predetermined frequency or less. In this case, the predetermined use frequency may be set by the user. In FIG. 7, it is assumed that the predetermined frequency is 20. As a result of the examination, the processor 130 may exclude 'man' and 'sight' of which the use frequency is the predetermined frequency or less from the basic keyword and determine only 'morning', 'Manolin', and 'shack' as the basic keyword 10.

It is assumed that the predetermined use frequency is set by the user, but is not limited thereto. For example, a reference of the use frequency may be determined based on the highest use frequency among the use frequencies of the respective extracted nouns or an average value of the use frequencies of the respective extracted nouns may be determined as the reference of the use frequency.

FIG. 7 discloses a configuration in which among the respective words, words of which the use frequency is the predetermined use frequency or less are excluded from the basic keyword 10. However, the present invention is not limited thereto and the number of relevant keywords 20 may be determined in proportion to the use frequency. This will be described in FIG. 8.

Figure 8:
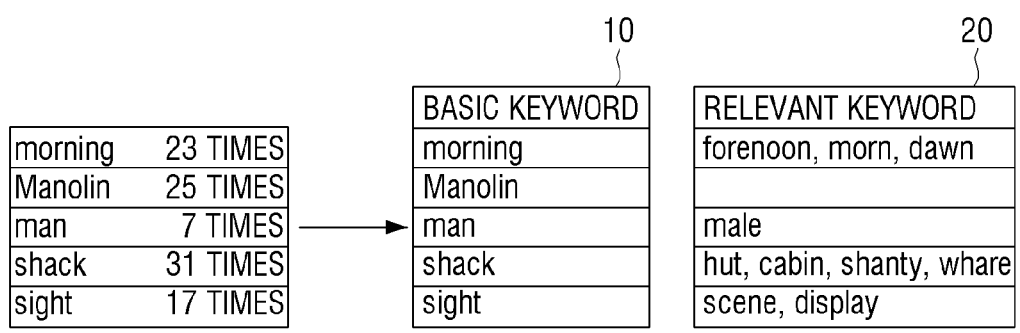
FIG. 8 is a diagram for describing a method for determining a relevant keyword according to an exemplary embodiment.

FIG. 8 is a diagram for describing a method for determining a relevant keyword 20 according to an exemplary embodiment.

According to FIG. 8, the processor 130 may determine the number of relevant keywords 20 in proportion to the use frequency. In detail, the processor 130 may determine the relevant keyword so that the number of relevant keywords 20 of 'shack' of which the use frequency is high is the largest and the number of relevant keywords 20 of 'man' of which the use frequency is low is the smallest. That is, the processor 130 may allow 'shack' having the high use frequency to have four relevant keywords 20 of 'hut', 'cabin', 'shanty', and 'whare' and 'man' having the low use frequency to have one relevant keyword 20 of 'male'. In FIG. 8, a proportional relationship between the respective basic keywords 10 is set by rounding up the numbers to ones place of the use frequency. However, the present invention is not limited thereto and the proportional relationship may be set by rounding or rounding off.

Further, in FIG. 8, the synonym is used as the relevant keyword 20, and as a result, the relevant keyword 20 for 'Manolin' which is a proper pronoun is not determined. However, this is just an exemplary embodiment and when the relevant retrieval word is used as the relevant keyword 20, the relevant keyword 20 for 'Manolin' may be determined.

Further, the processor 130 may determine the number of relevant keywords 20 based on the use frequency with only the residual words while excluding the word which is used less than the predetermined use frequency from the basic keyword 10 as illustrated in FIG. 7.

In such an example, by setting all numerous words included in the plot information 310 as the basic keyword 10 or controlling the number of relevant keywords 20, it is possible to solve a problem in that the generation time of the summary contents is very long.

Figure 9:
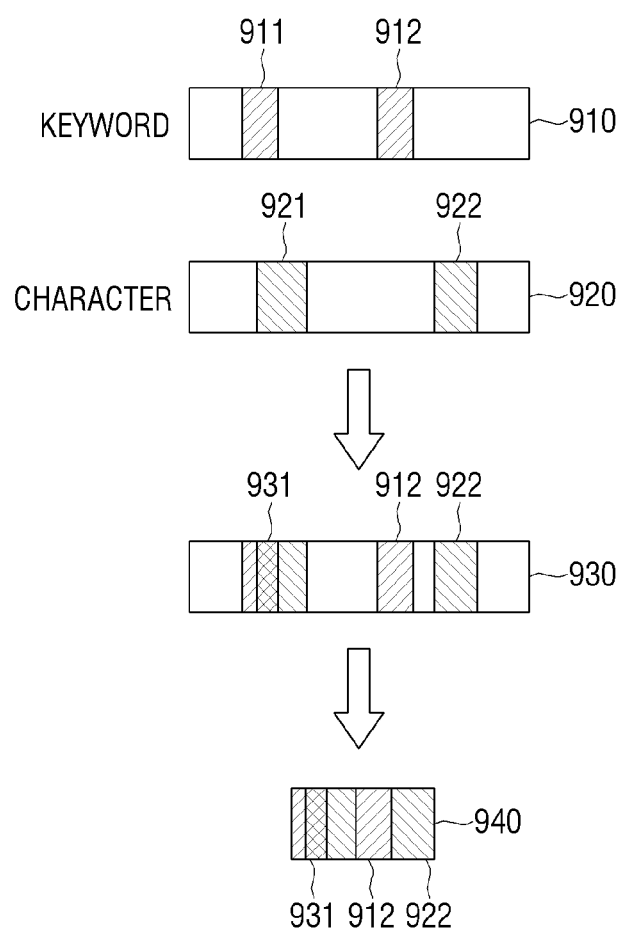
FIG. 9 is a diagram for describing a case of further using an image of a character according to an exemplary embodiment.

FIG. 9 is a diagram for describing a case of further using an image of a character according to an exemplary embodiment.

According to FIG. 9, the additional information of the contents received by the communication unit 110 may include an image of the character of the contents. The processor 130 may add a video frame including the image of the character among the plurality of video frames to the summary contents. That is, the processor 130 may generate the summary contents by using all of video frame sections 911 and 912 corresponding to the keyword and video frame sections 921 and 922 corresponding to the image of the character.

In detail, the processor 130 may extract temporal information of video frames 931, 912, and 922 corresponding to at least one of the keyword and the image of the character based on temporal information of the video frame corresponding to the keyword or the image of the character. Thereafter, the processor 130 removes a video frame which is not extracted based on the extracted temporal information to generate final summary contents 940.

In FIG. 9, a configuration of extracting the video frame corresponding to at least one of the keyword and the image of the character is described, but is not limited thereto. For example, the processor 130 may extract only the video frame corresponding to both the keyword and the image of the character or only the video frame corresponding to the image of the character.

Figure 10:
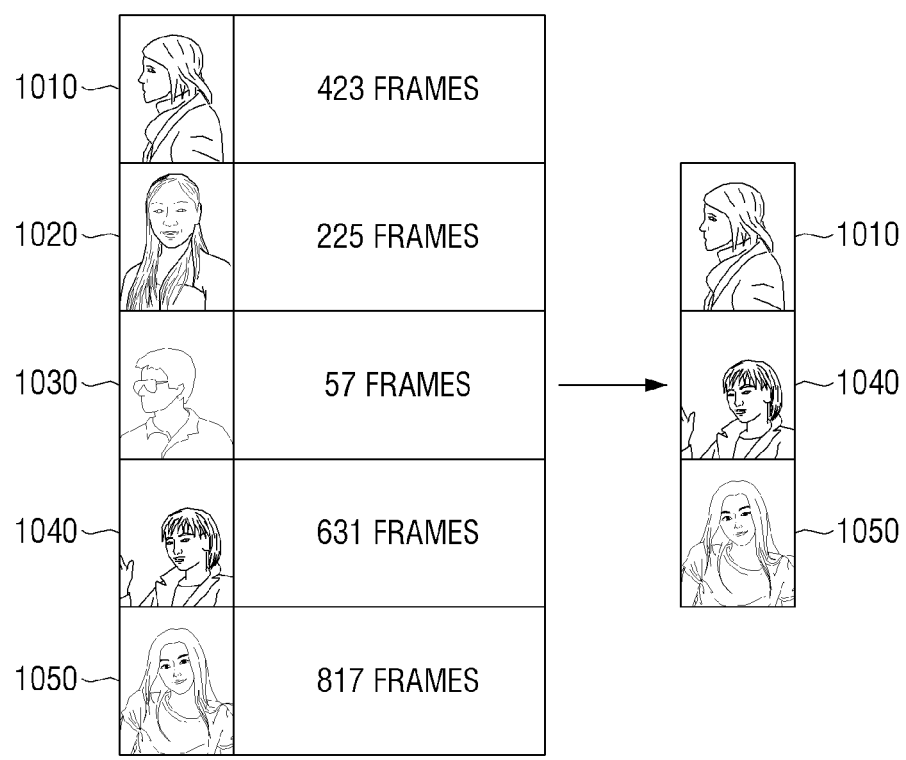
FIG. 10 is a diagram for describing that the summary contents are generated by reflecting importance of respective characters according to an exemplary embodiment.

FIG. 10 is a diagram for describing that the summary contents are generated by reflecting importance of respective characters according to an exemplary embodiment.

According to FIG. 10, the processor 130 may verify the frequency of a video frame in which the image is displayed for each character in the entirety of the contents. In FIG. 10, it is assumed that a first character 1010 appears in as many as 423 frames, a second character 1020 appears as many as 225 frames, a third character 1030 appears as many as 57 frames, a fourth character 1040 appears as many as 631 frames, and a fifth character 1050 appears as many as 817 frames.

In addition, in the case of a character which appears at a predetermined frequency or less, the processor 130 may generate summary contents while excluding the video frame in which the image of the character is displayed. When the predetermined frequency is assumed as 300 frames, the processor 130 may generate the summary contents while excluding the video frame in which the images of the second and third characters 1020 and 1030 are displayed.

The predetermined frequency may be, in advance, set by the user, but is not limited thereto. For example, not the user but the processor 130 may determine the predetermined frequency based on an average of frequencies after the frequency of the video frame in which the image is displayed for each character is calculated.

Through such an example, the processor 130 may determine a primary character according to the frequency at which the character appears in all contents and generate the summary contents mainly for the primary character.

Figure 11A:
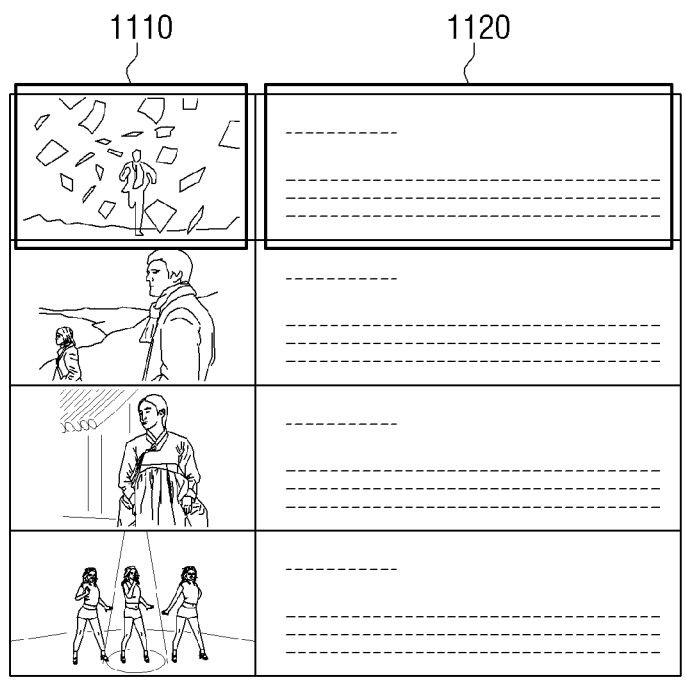
FIGS. 11A, 11B and 11C are diagrams describing a method for displaying the summary contents according to diverse exemplary embodiments.
Figure 11B:
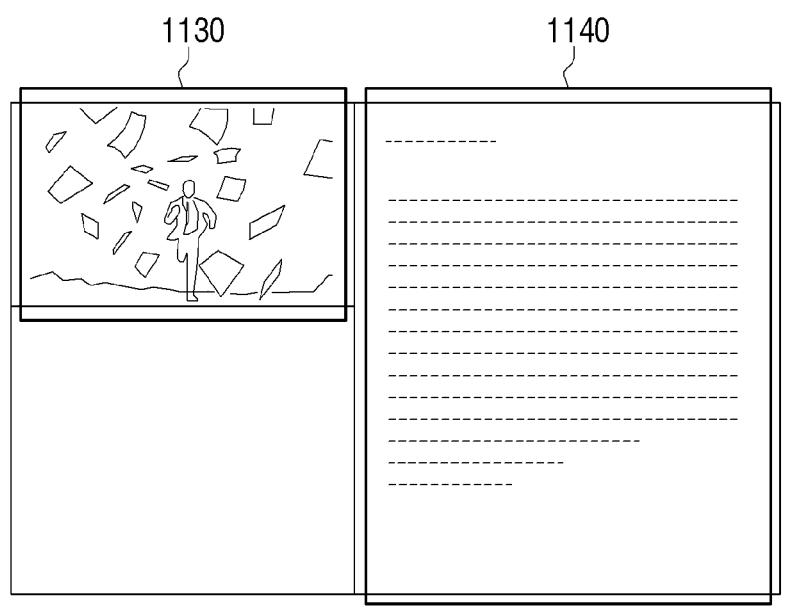
Figure 11C:

FIGS. 11A, 11B and 11C are diagrams for describing a method for displaying the summary contents according to diverse exemplary embodiments. According to FIG. 11, the electronic apparatus 100 may further include a display unit. Further, in FIG. 11, a configuration in which the summary contents are generated and displayed is described.

The summary contents may be generated by a service provider. In this case, the electronic apparatus 100 may be a server. The user may select specific contents by accessing the server and the electronic apparatus 100 may transmit pregenerated summary contents for the specific contents to the user.

Meanwhile, the summary contents may be generated by the user. In this case, the electronic apparatus 100 may be a display apparatus or a set-top box in the home. The user may input a generation command of the summary contents during viewing the specific contents or on a UI screen providing a content list. Detailed contents thereof will be described below.

FIG. 11A is a diagram illustrating a UI screen providing a content list according to an exemplary embodiment.

According to FIG. 11A, the processor 130 may display the UI screen providing the content list. The processor 130 may display the summary contents for respective contents on a left column of the content list and information on corresponding contents on a right column. However, the processor is not limited thereto and the processor 130 may display a thumbnail of the contents on the left column and in particular, regenerate only focused contents 1110 as the summary contents when the electronic apparatus 100 supports a focus. In this case, the processor 130 may regenerate only the summary contents of the focused contents 1110 and display the thumbnail with respect to residual contents which are not focused or display the thumbnail while stopping only a start screen of residual summary contents which are not focused. In this case, when the focus is changed to another position, the summary contents may be displayed on the start screen in the stop state.

Information 1120 on the focused contents may include a title of the contents, a running time, and a plot. However, the information 1120 is not limited thereto and may further include information on the summary contents.

FIG. 11B is a diagram illustrating a UI screen providing content summary information according to another exemplary embodiment.

According to FIG. 11B, the processor 130 may display the UI screen providing the content summary information. The UI screen providing the content summary information may be displayed when any one content is selected on the screen such as FIG. 11A.

The processor 130 may display summary contents 1130 and information 1140 on the corresponding contents on the UI screen providing the content summary information. The processor 130 may regenerate the summary contents 1130, but is not limited thereto. For example, the summary contents 1130 may stand as a still picture and may be regenerated according to a regeneration command of the user, and the like.

Meanwhile, the information 1140 on the contents may include the title of the contents, the running time, and the plot as described above. However, more information than FIG. 11A may be displayed and in particular, as the summary contents 1130 are regenerated, corresponding plot information may be displayed.

FIG. 11C is a diagram illustrating a screen displaying summary contents according to yet another exemplary embodiment.

According to FIG. 11C, the processor 130 may control the display unit to display summary contents 1150 and plot information 1160 corresponding to a scene of summary contents which are being regenerated. In detail, the processor 130 may generate the summary contents according to the diverse exemplary embodiments and make a video frame corresponding to the plot information 1160 to correspond to each plot information 1160 during generating the summary contents. Thereafter, when generation of the summary contents is completed, the processor 130 may display the summary contents simultaneously. However, the processor 130 is not limited thereto and the processor 130 may be configured to extract a part corresponding to the summary contents from the plot information 1160 after the summary contents are generated.

Meanwhile, in FIG. 11C, it is described that the processor 130 displays the summary contents 1150 and the plot information 1160 corresponding to the scene of the summary contents which are being regenerated through the display unit, but is not limited thereto. For example, the processor 130 may encapsulate the plot information 1160 corresponding to the scene of the summary contents before the summary contents are generated to generate the summary contents 1150. That is, the processor 130 may not display the plot information 1160 separately from the summary contents but display the summary contents including the plot information 1160.

Meanwhile, in FIG. 11, the method is described, in which the summary contents are displayed on the UI screen, and the like while being generated and stored, but is not limited thereto. For example, when the user inputs the generation command of the summary contents, the processor 130 may control the summary contents for the corresponding contents to be generated. A detailed description thereof will be described below. When generation of the summary contents is completed, the processor 130 may control the generated summary contents to be displayed. Alternatively, the processor 130 may display that the generation of the summary contents is completed to the user or allow the summary contents to be regenerated according to the regeneration command of the user.

In FIG. 11, described is the method that provides the pregenerated summary contents to the user. In FIG. 12, described is a method in which the summary contents are generated by the user.

FIG. 12 is a diagram for describing a method for generating the summary contents according to an exemplary embodiment.

A first portion of FIG. 12 is a diagram in which the user inputs the generation command of the summary contents while the specific contents are displayed. The user may input the generation command of the summary contents when going out during watching the specific contents or other cases in which viewing is difficult occur. Further, the user may input the generation command of the summary contents in order to upload the viewing specific contents on SNS, and the like. In this case, the processor 130 may control the generated summary contents to an SNS server.

Further, when the generation command of the summary contents for the specific contents which are being streamed is input, the processor 130 may wait until receiving all of the specific contents and thereafter, generate the summary contents when the receiving is completed. However, the processor is not limited thereto and the summary contents are generated only up to a part of the specific contents of which regeneration is completed and the processor generates a part of which regeneration is not yet completed as the summary contents when the receiving is completed to be merged with the pregenerated summary contents. Hereinafter, described is that all of the specific contents are received and thereafter, the summary contents are generated.

When the user inputs the generation command of the summary contents, the processor 130 may display a verify message 1210 such as "Do you want to generate the summary contents?". However, this is just an exemplary embodiment and the summary contents may be immediately generated according to the summary contents generation command of the user without displaying the verify message 1210.

A second portion of FIG. 12 is a diagram in which the user selects 'Yes' while the verify message 1210 is displayed. As a result, the processor 130 generates the summary contents. The processor 130 may display a message 1220 such as "The summary contents are being generated." while generating the summary contents. However, this is just an exemplary embodiment and the contents which are being displayed may be continuously displayed without displaying the message 1220. Further, although the display apparatus 100 is turned off, the summary contents may be generated while power is supplied.

A third figure of FIG. 12 is a diagram in which the generation of the summary contents is completed, and as a result, the summary contents are displayed. When the summary contents are generated, the processor 130 may immediately display the generated summary contents. However, the processor 130 is not limited thereto and may display only the message indicating that the summary contents are generated.

Meanwhile, in FIG. 12, described is the case in which the summary contents are generated while the user views the contents, but the present invention is not limited thereto. For example, the user may input the summary content generation command for the specific contents on the UI screen providing the content list or the UI screen providing the content summary information as illustrated in FIGS. 11A and 11B.

Figure 13:
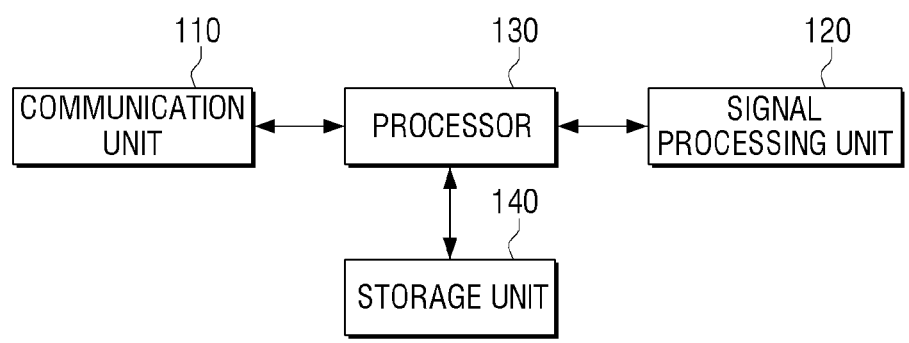
FIG. 13 is a diagram for describing additional information of contents according to an exemplary embodiment.

FIG. 13 is a diagram for describing additional information of contents according to an exemplary embodiment. A description of a part of a configuration of FIG. 13, which is duplicated with FIG. 1 will be omitted.

According to FIG. 13, the display apparatus 100 may additionally include a storage unit 140 in addition to the communication unit 110, the signal processing unit 120, and the processor 130. The processor 130 may receive the contents and the additional information for the contents through the communication unit 130. The signal processing unit 120 signal-processes the contents to separate the signal-processed contents into the audio signal, the video frame, and the metadata. Among them, the metadata may be stored in the storage unit 140. Further, the processor 130 may store in the storage unit 140 the additional information for the contents received through the communication unit 110.

The processor 130 may analyze the audio signal, the video frame, and the metadata of the received contents. For example, the processor 130 may convert the audio signal to text and store the text pertaining to audio signal in the storage unit 140 when analyzing the audio signal. In this case, a voice recognition technology may be used. Further, the processor 130 may extract the image of the character from the video frame and store the extracted image in the storage unit 140 when analyzing the video frame. In this case, a face recognition technology may be used.

The storage unit 140 may store even information generated by analyzing the contents in addition to the additional information for the contents. The processor 130 may determines the basic keyword based on the stored information.

Further, the processor 130 may be used to generate the summary contents through the image of the character.

Further, the storage unit 140 may store the generated summary contents together with the basic keyword, the relevant keyword, and the plot. However, the storage unit 140 is not limited thereto and the storage unit 140 may store only the summary contents together with the contents corresponding thereto. Further, when the number of summary contents increases, and as a result, a storage space is insufficient, the summary contents may be deleted according to the generation order. When the summary contents are deleted, whether to delete the summary contents may be queried to the user.

Figure 14:
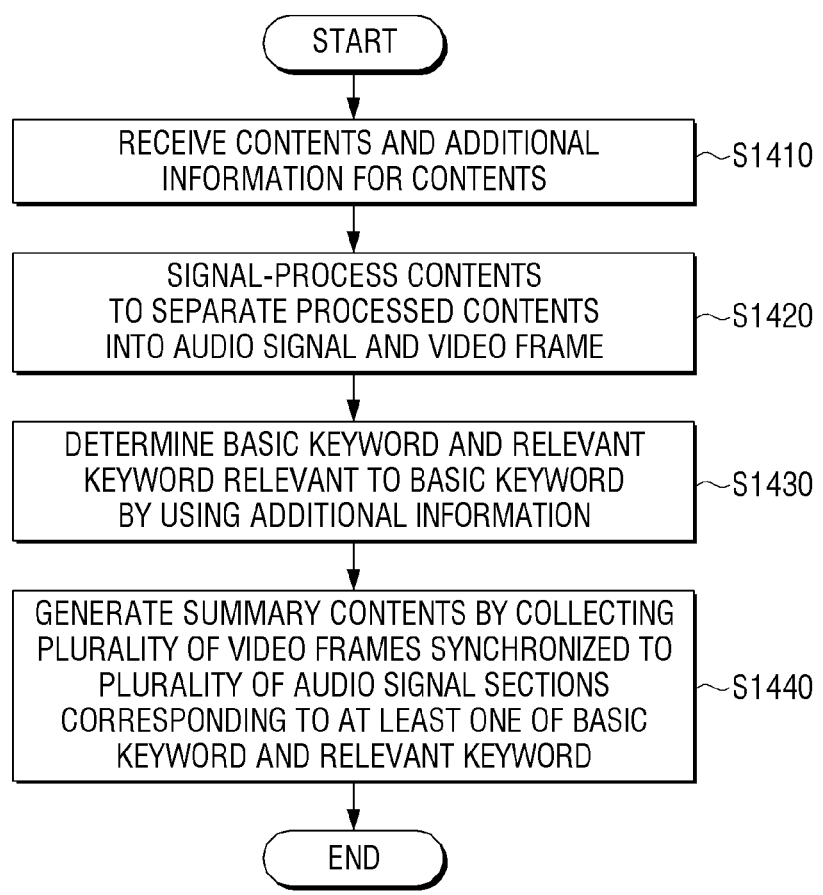
FIG. 14 is a flowchart for describing a method for generating summary contents by an electronic apparatus according to an exemplary embodiment.

FIG. 14 is a flowchart for describing a method for generating summary contents by an electronic apparatus 100 according to an exemplary embodiment.

According to FIG. 14, the electronic apparatus 100 receives the contents and the additional information for the contents (S1410). The additional information for the contents may be information received through the Internet, and may also be information generated by analyzing the contents. In addition, the contents are signal-processed to be separated into the audio signal and the video frame (S1420). Further, the metadata may be generated during the signal processing.

In addition, the basic keyword 10 and the relevant keyword 20 relevant to the basic keyword 10 are determined by using the additional information (S1430). The basic keyword 10 may be extracted from the additional information for the contents through a specific filtering process. The relevant keyword 20 may be derived from the basic keyword 10 by a predetermined method and some of the derived relevant keywords 20 may be excluded from the relevant keyword 20 through the specific filtering process.

In addition, the summary contents may be generated by collecting a plurality of video frames synchronized to a plurality of audio signal sections corresponding to at least one of the basic keyword and the relevant keyword among generated audio signal sections (S1440).

Further, the additional information includes plot information acquired by summarizing data of the content and in the determining of the relevant keyword (S1430), each of words included in the plot information may be detected as the basic keyword and the basic keyword is retrieved in a predetermined server and a keyword retrieved continuously with the basic keyword may be determined as the relevant keyword.

In addition, in the generating of the summary contents (S1440), the contents may be divided into a plurality of content sections, the plot information may be divided into a plurality of plot sections in ranges corresponding to the plurality of content sections, respectively, the basic keyword and the relevant keyword may be determined for each of the plurality of plot sections, and an audio signal section corresponding to the determined keyword may be discovered for each of content sections corresponding to each plot section.

Further, in the generating of the summary contents (S1440), when the audio signal sections corresponding to at least one of the basic keyword and the relevant keyword are detected with a predetermined number or more within a specific section of the contents, the entirety of the specific section may be included in the summary contents.

In addition, in the generating of the summary contents (S1440), when a temporal difference between a first video frame which is one of the plurality of video frames and a second video frame which is the other one is less than a predetermined threshold time, all video frames between the first video frame and the second video frame may be included in the summary contents.

Further, in the generating of the summary contents (S1440), a word which is used at a predetermined frequency or less among the respective words included in the plot information may be excluded from the basic keyword.

In addition, the additional information may include the image of the character of the contents and in the generating of the summary contents (S1440), a video frame in which the image is displayed among the plurality of video frames may be added to the summary contents.

Further, in the generating of the summary contents (S1440), with respect to a character which appears at a predetermined frequency or less by verifying the frequency of the video frame in which the image is displayed for each character in the entirety of the contents, the summary contents may be generated while excluding the video frame in which the image of the character is displayed.

In addition, in the determining of the relevant keyword (S1430), the basic keyword may be detected from the metadata and the relevant keyword relevant to the basic keyword may be determined.

Further, the summary contents may be displayed on at least one of the UI screen providing the content list and the UI screen providing the content summary information.

Meanwhile, it is described that the aforementioned electronic apparatus 100 is a component that basically uses the keyword. Hereinafter, more diverse exemplary embodiments will be described.

Figure 15:
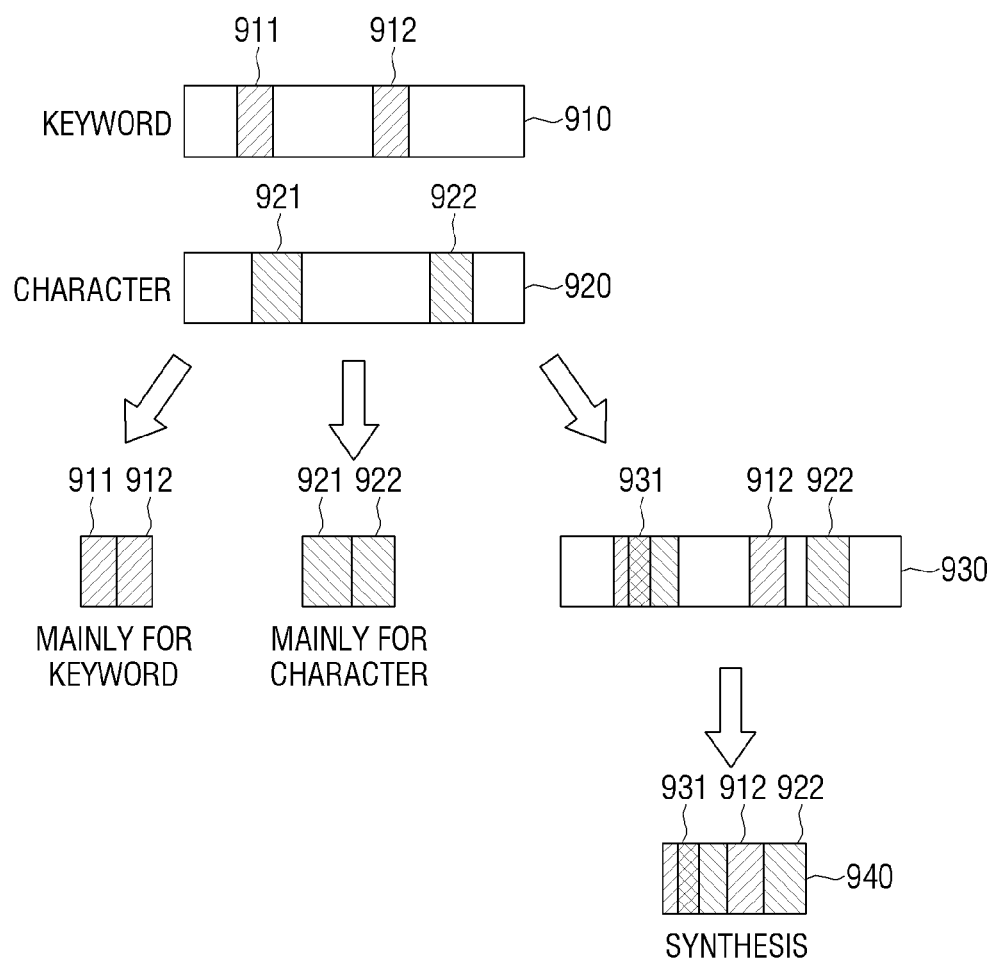
FIG. 15 is a diagram for describing diverse exemplary embodiments.

FIG. 15 is a diagram for describing diverse exemplary embodiments.

According to FIG. 15, the processor 130 may extract video frame sections 911 and 912 corresponding to the keyword. In addition, the processor 130 may generate the summary contents mainly for the keyword by using only the extracted video frame sections 911 and 912. A description thereof is made as above.

Further, the processor 130 may extract video frames 921 and 922 corresponding to the image of the character. In addition, the processor 130 may generate the summary contents primarily based on the character by using only the extracted video frames 921 and 922. The aforementioned configuration is different from a configuration in which the video frames 921 and 922 corresponding to the image of the character are added to the video frames 911 and 912 corresponding to the keyword. When the summary contents are generated by using only the video frames 921 and 922 corresponding to the image of the character, a visual effect may be maximized.

In FIG. 15, the configuration that extracts the video frames to correspond to the keyword or the image of the character is illustrated, but the present invention is not limited thereto. For example, only a video frame including only a specific audio signal generated when a face is detected may be extracted.

Meanwhile, the processor 130 may generate the summary contents by using the video frames 911 and 912 corresponding to the keyword and the video frames 921 and 922 corresponding to the image of the character. Since this is the aforementioned configuration, a detailed description thereof will be omitted.

Figure 16:
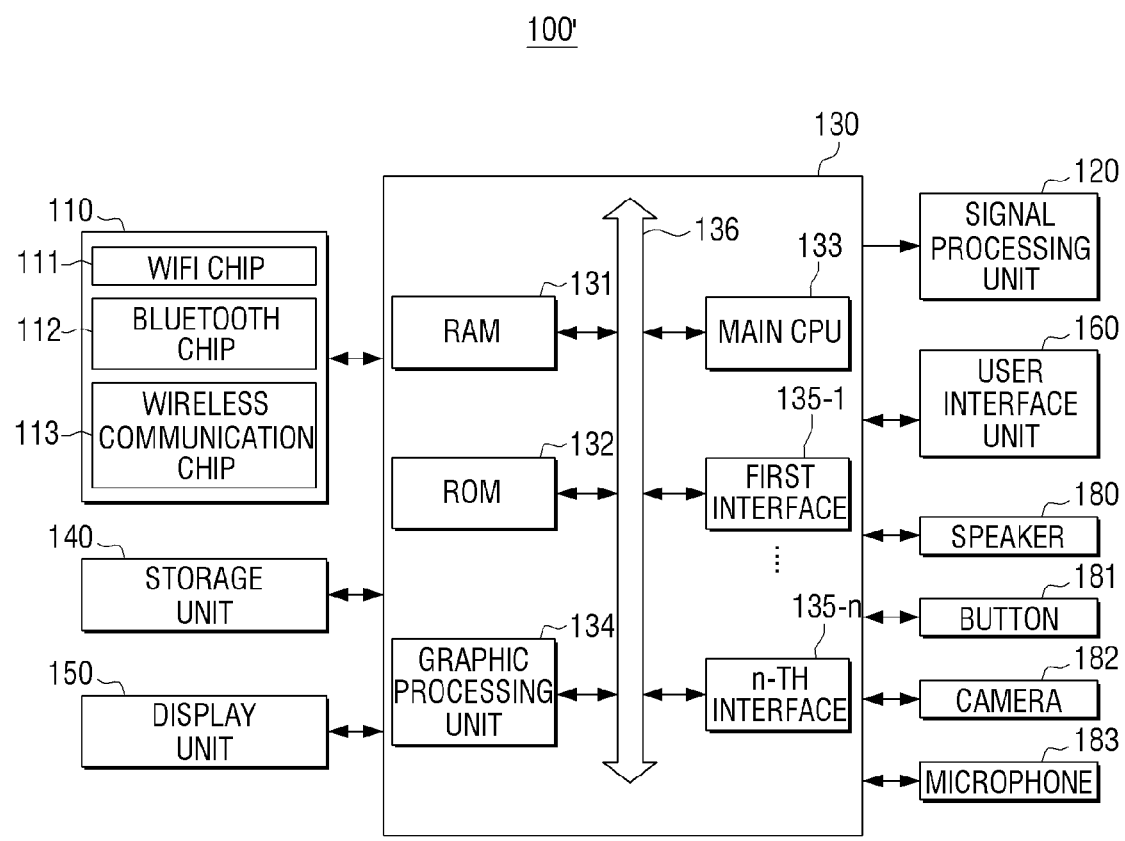
FIG. 16 is a block diagram illustrating a detailed configuration of an electronic apparatus according to another exemplary embodiment.

FIG. 16 is a block diagram illustrating a detailed configuration of an electronic apparatus 100' according to another exemplary embodiment. According to FIG. 16, the electronic apparatus 100' includes a communication unit 110, a signal processing unit 120, a processor 130, a storage unit 140, a display unit 150, a user interface unit 160, a speaker 180, a button 181, a camera 182, and a microphone 183. A detailed description of components duplicated with the components illustrated in FIG. 1 among the components illustrated in FIG. 16 will be omitted.

The processor 130 generally controls an operation of the electronic apparatus 100' by using various programs stored in the storage unit 140.

In detail, the processor 130 includes a RAM 131, a ROM 132, a main CPU 133, a graphic processing unit 134, first to n-th interfaces 135-1 to 135-n, and a bus 136.

The RAM 131, the ROM 132, the main CPU 133, the graphic processing unit 134, and the first to n-th interfaces 135-1 to 135-n may be connected to each other through the bus 136.

The first to n-th interfaces 135-1 to 135-n are connected with various components. One among the interfaces may be a network interface connected with an external apparatus through a network.

The main CPU 133 accesses the storage unit 140 to perform booting by using an O/S stored in the storage unit 140. In addition, the main CPU 133 performs various operations by using various programs stored in the storage unit 140.

The ROM 132 stores a command set for system booting, and the like. When a turn-on command is input to supply power, the main CPU 133 copies the O/S stored in the storage unit 140 to the RAM 131 according to a command stored in the ROM 132 and executes the O/S to boot a system. When the booting is completed, the main CPU 133 copies various application programs stored in the storage unit 140 to the RAM 131 and executes the application programs copied to the RAM 131 to perform various operations.

The graphic processing unit 134 generates a screen including various objects including icons, images, texts, and the like by using a calculation unit (not illustrated) and a rendering unit (not illustrated). The calculation unit (not illustrated) calculates attribute values including coordinate values, shapes, sizes, colors, and the like by which the respective objects are to be displayed according to a layout of the screen based on a received control command. The rendering unit (not illustrated) generates screens having various layouts including the objects based on the attribute values calculated in the calculation unit (not illustrated). The screen generated in the rendering unit (not illustrated) is displayed in a display area of the display unit 150.

Meanwhile, the processor 130 may operate by the programs stored in the storage unit 140.

The storage unit 140 stores various data including an operating system (O/S) software module for driving the electronic apparatus 100', a keyword extraction module, a video frame extraction module, a voice recognition module, and the like.

In this case, the processor 130 extracts the keyword based on the information stored in the storage unit 140 to generate the summary contents.

The user interface unit 160 receives various user interactions. Herein, the user interface unit 160 may be implemented in various forms according to an implementation example of the electronic apparatus 100'. When the electronic apparatus 100 is implemented as a digital TV, the user interface unit 160 may be implemented by a remote controller receiver receiving a remote controller signal from a remote control device, a camera sensing a user motion, a microphone receiving a user's voice, and the like. Further, when the electronic apparatus 100' is implemented as a touch based portable terminal, the user interface unit 160 may be implemented in a touch screen form having an inter-layer structure with a touch pad. In this case, the user interface unit 160 may be used as the display unit 150.

The speaker 180 is a component that outputs various notification sounds or voice messages in addition to various audio data processed by the signal processing unit 120.

The button 181 may be various types of buttons including a mechanical button, a touch pad, a wheel, and the like formed in a predetermined area such as a front surface, a side, a rear surface, or the like of a body exterior of the electronic apparatus 100'.

The camera 182 is a component for photographing a still image or a moving picture according to a user's control. The camera 182 may be implemented by a plurality of cameras such as a front camera and a rear camera. The microphone 183 is a component that receives the user's voice or other sounds and converts the received user's voice or other sounds into audio data.

As described above, according to the diverse exemplary embodiments, the electronic apparatus may automatically generate the summary contents. In detail, the electronic apparatus extracts the keywords in the additional information for the contents and collects the video frames corresponding thereto to generate the summary contents. As a result, since the summary contents may be conveniently generated while faithfully reflecting the contents, efficiency is improved.

Meanwhile, the methods according to the various exemplary embodiments are programmed to be stored in various storage media. As a result, in various types of electronic apparatuses that execute the storage media, the methods according to the various exemplary embodiments may be implemented.

In detail, according to an exemplary embodiment, a non-transitory computer readable medium storing a program sequentially performing receiving contents and additional information for the contents; signal-processing the contents and separating the signal-processed contents into an audio signal and a video frame; determining a basic keyword and a relevant keyword relevant to the basic keyword by using the additional information; and generating the summary contents by collecting a plurality of video frames synchronized to a plurality of audio signal sections corresponding to at least one of the basic keyword and the relevant keyword.

The non-transitory computer readable medium means not a medium that stores data for a short moment, such as a register, a cache, a memory, or the like but means a medium that semipermanently stores data and is readable by an apparatus. In detail, various applications or programs may be provided while being stored in the non-transitory computer readable medium such as a CD, a DVD, a hard disk, a Blu-ray disk, a USB, a memory card, a ROM, or the like.

According to the diverse exemplary embodiments, the electronic apparatus determines a keyword by using additional information for contents and collects video frames synchronized to an audio signal section corresponding thereto to automatically generate summary contents. As a result, efficiency can be improved in generating the summary contents.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic apparatus, comprising:
   a communication unit configured to receive a content and additional information for the content;
   a signal processing unit configured to perform signal-processing of the content and determine the signal-processed content as one of an audio signal and a video frame; and
   a processor configured to determine a first keyword and a second keyword for the first keyword by using the additional information and generate a summary content according to a plurality of video frames synchronized to a plurality of audio signal sections corresponding to at least one of the first keyword and the second keyword.

2. The electronic apparatus as claimed in claim 1, wherein the additional information includes plot information summarizing the content, and
   the processor detects at least one word included in the plot information as the first keyword, retrieves the first keyword from a server and determines a keyword retrieved continuously with the first keyword as the second keyword.

3. The electronic apparatus as claimed in claim 2, wherein the processor divides the content into a plurality of content sections, divides the plot information into a plurality of plot sections to correspond to the divided plurality of content sections, respectively, and
   the processor determines the first keyword and the second keyword for the plurality of plot sections, and determines a corresponding audio signal section for the plurality of content sections corresponding to the plurality of plot sections.

4. The electronic apparatus as claimed in claim 3, wherein a plurality of audio signal sections including the corresponding audio signal section are determined to correspond to at least one of the first keyword and the second keyword, and
   the processor encapsulates, when the plurality of audio signal sections determined is equal to or greater than a predetermined number within a section among the plurality of content sections, an entirety of the section in the summary content.

5. The electronic apparatus as claimed in claim 1, wherein the processor encapsulates, when a temporal difference between a first of the plurality of video frames and a second of the plurality of video frames is less than a threshold, all video frames between the first and the second of the plurality of video frames in the summary content.

6. The electronic apparatus as claimed in claim 2, wherein the processor excludes a word which is used at a predetermined frequency or less among other words included in the plot information from the first keyword.

7. The electronic apparatus as claimed in claim 1, wherein:
   the additional information includes an image of a character of the content, and
   the processor adds a video frame in which the image is displayed among the plurality of video frames to the summary content.

8. The electronic apparatus as claimed in claim 7, wherein the processor, with respect to a character which appears at a predetermined frequency or less by verifying a frequency of the video frame in which the image is displayed for each character in the entirety of the content, and generates the summary content while excluding the video frame in which the image of the character is displayed.

9. The electronic apparatus as claimed in claim 1, wherein the processor detects the first keyword from metadata and determines the second keyword as being relevant to the first keyword.

10. The electronic apparatus as claimed in claim 2, further comprising:
a display unit, and
wherein the processor controls the summary content to be displayed on at least one of a user interface (UI) screen providing a content list and a UI screen providing content summary information.

11. A method of generating summary content by an electronic apparatus, the method comprising:
receiving content and additional information for the content;
signal-processing the content and determining the signal-processed content as one of an audio signal and a video frame;
determining a first keyword and a second keyword for the first keyword by using the additional information; and
generating a summary content by collecting a plurality of video frames synchronized to a plurality of audio signal sections corresponding to at least one of the first keyword and the second keyword.

12. The method as claimed in claim 11, wherein the additional information includes plot information summarizing the content, and
the determining of the second keyword includes detecting at least one word included in the plot information as the first keyword, retrieving the first keyword from a server, and determining a keyword retrieved continuously with the first keyword as the second keyword.

13. The method as claimed in claim 12, wherein in the generating of the summary content, the content are divided into a plurality of content sections, the plot information is divided into a plurality of plot sections to correspond to the plurality of content sections, respectively, and
the first keyword and the second keyword are determined for the plurality of plot sections, and a corresponding audio signal section is determined for of the plurality of content sections corresponding to the plurality of plot sections.

14. The method as claimed in claim 13, wherein a plurality of audio signal sections including the corresponding audio signal section are determined to correspond to at least one of the first keyword and the second keyword, and
in the generating of the summary content, when the plurality of audio signal sections determined is equal to or greater than a predetermined number within a section among the plurality of content sections, an entirety of the section is included in the summary content.

15. The method as claimed in claim 11, wherein in the generating of the summary content, when a temporal difference between a first of the plurality of video frames and a second of the plurality of video frames is less than a threshold, all video frames between the first and the second of the plurality of video frames are included in the summary content.

16. The method as claimed in claim 12, wherein in the generating of the summary content, a word which is used at a predetermined frequency or less among other words included in the plot information is excluded from the first keyword.

17. The method as claimed in claim 11, wherein:
the additional information includes an image of a character of the content, and
in the generating of the summary content, a video frame in which the image is displayed among the plurality of video frames is added to the summary content.

18. The method as claimed in claim 17, wherein in the generating of the summary content, with respect to a character which appears at a predetermined frequency or less by verifying the frequency of the video frame in which the image is displayed for each character in the entirety of the content, the summary content are generated while excluding the video frame in which the image of the character is displayed.

19. The method as claimed in claim 11, wherein in the determining of the second keyword, the first keyword is detected from metadata and the second keyword as being relevant to the first keyword is determined.

20. The method as claimed in claim 12, further comprising:
displaying the summary content on at least one of a UI screen providing a content list and a UI screen providing content summary information.

* * * * *